Dec. 13, 1927.
T. DUNBAR
1,652,819
POWER TRANSMISSION MECHANISM
Filed Feb. 16, 1926
2 Sheets-Sheet 1
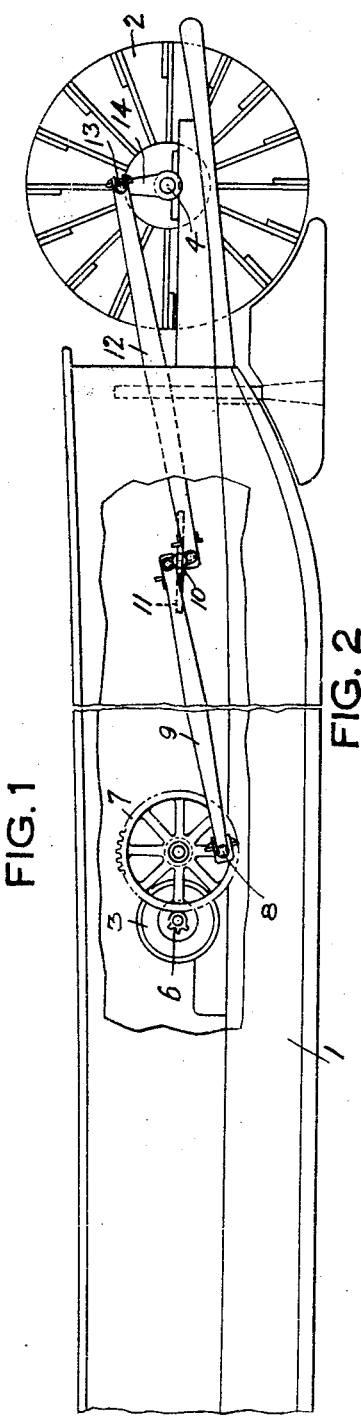
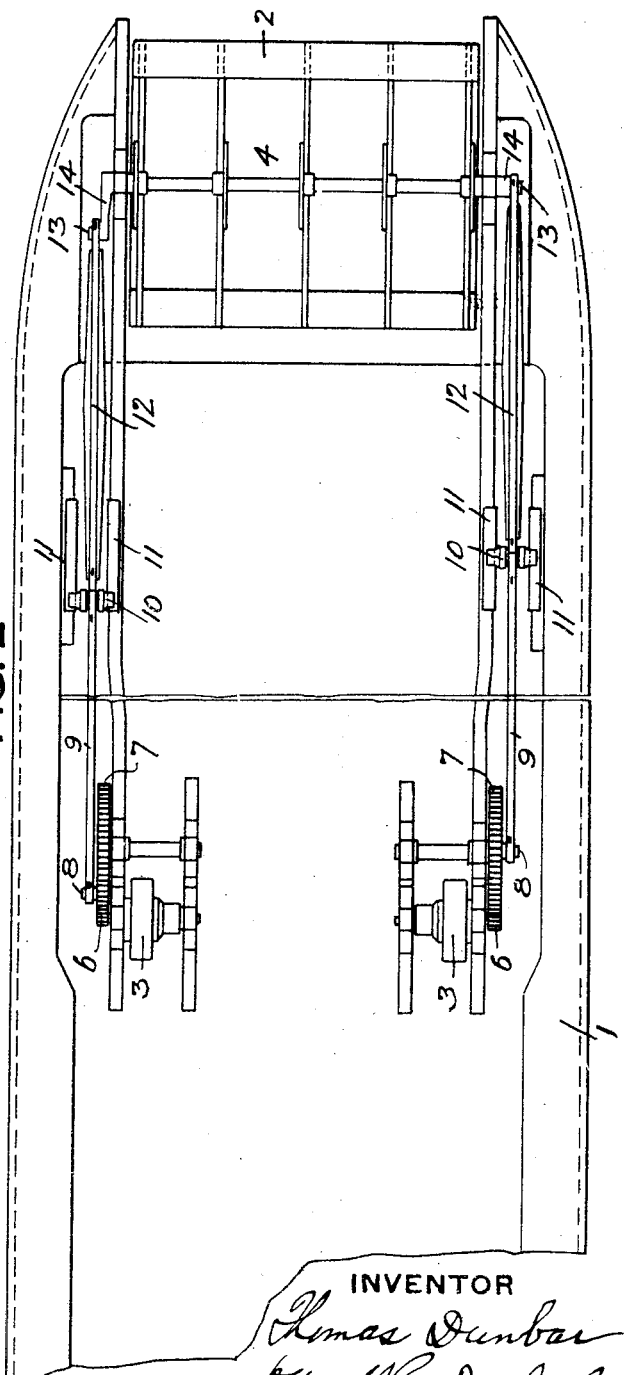
INVENTOR
Thomas Dunbar
by W. E. Doolittle
Attorney.

Dec. 13, 1927.
T. DUNBAR
1,652,819
POWER TRANSMISSION MECHANISM
Filed Feb. 16, 1926
2 Sheets-Sheet 2
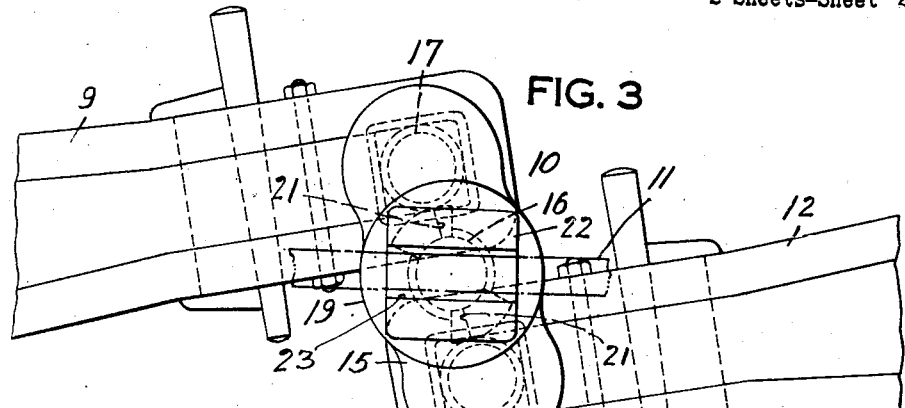
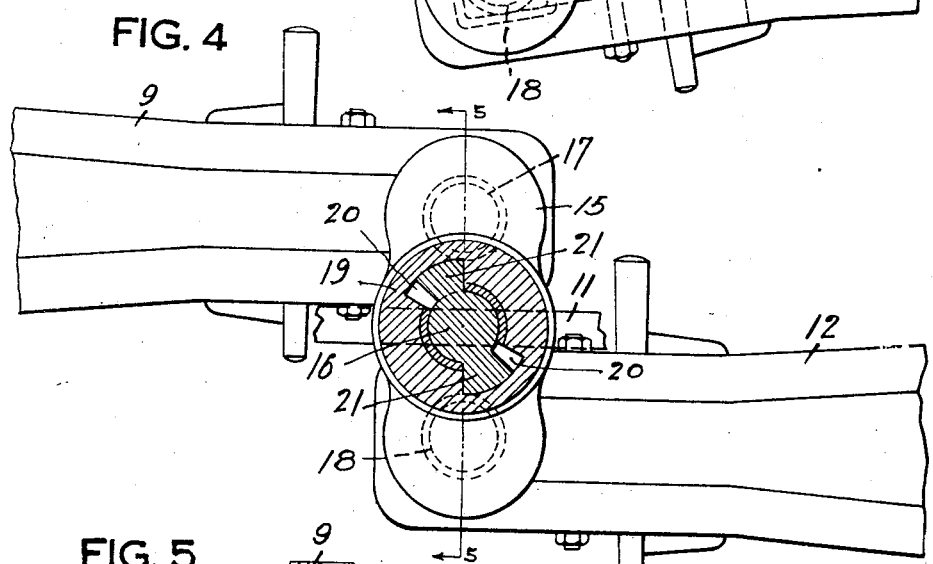
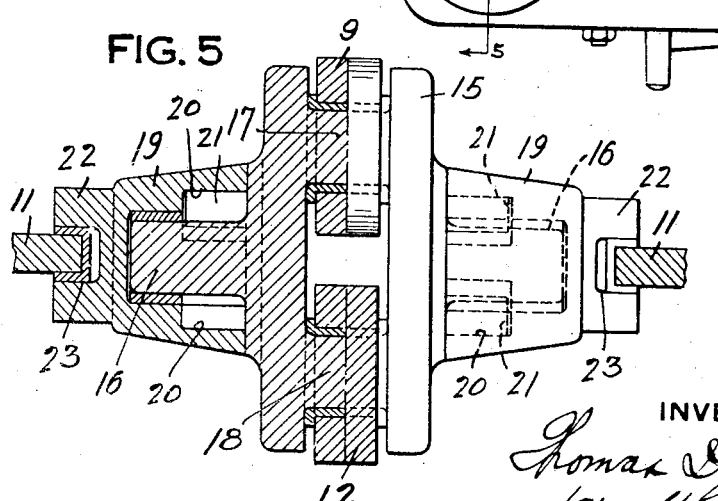
INVENTOR
Thomas Dunbar
by W. G. Doolittle
Attorney.

Patented Dec. 13, 1927.

1,652,819

UNITED STATES PATENT OFFICE.

THOMAS DUNBAR, OF PITTSBURGH, PENNSYLVANIA.

POWER-TRANSMISSION MECHANISM.

Application filed February 16, 1926. Serial No. 88,548.

My invention relates to improvements in power transmission mechanism and more particularly to power transmission mechanism designed for use in transmitting power from a rotary driving element to a rotary driven element.

My invention contemplates the employment in power transmission means, of a cross-head mounted on suitable guides or supports and having a compound rectilinear and oscillating movement thereon, and connecting rods, one connecting the cross-head with a rotary driven element and the other connecting the cross-head with a rotary driving element.

It is well known that in the use of cross-heads and connecting rods employed in power transmission mechanism there is a considerable variation in the length of travel of the connecting rods and the stroke of the cranks to which said rods connect during the forward and after center movements. This variation is not considered serious when the transmission is employed with steam engines, but it is a rather serious one when a motor drive is employed or rather when a rotary driven element is connected up with a rotary driving element.

Among the objects of my invention are, to provide in a power transmission mechanism a cross-head having a compound rectilinear and oscillating movement; a construction employing a cross-head having said compound movement and coupled up with a driving element and a driven element by connecting rods, said parts being so assembled and cooperating to effect uniform conditions of operations during the forward and after center movements of the parts.

A further object of the present invention is to provide a simple mechanism of the character specified above, employing a rotary driving element having a crank, a rotary driven element having a crank, a pivotally mounted cross-head, guides for the cross-head, and connecting rods leading from the cross-head to the cranks of the respective rotary elements; said cross-head arranged at the middle of the guides and with the said other parts all having a common center.

My invention is particularly designed to be employed in connection with Diesel engines with motor drive on water craft of the type having a stern wheel propeller, and while I have shown my invention embodied in this type of boat it should of course be understood that my power transmission mechanism may be employed for other purposes.

In the accompanying drawings, which illustrate an application of my invention:

Figure 1, is a side elevational view, partly broken away, of the stern portion of a stern wheel propeller boat showing my invention applied thereto;

Figure 2, a plan view of the lower deck showing my improved power transmission mechanism employed in connection with two driving motors and respectively positioned along the port and starboard sides of the boat;

Figure 3, an enlarged side elevational view, particularly showing the cross-head and the connecting rods respectively connecting the cross-head with the driving element and the driven element or propeller; this figure indicates the position of the cross-head on its pivotal bearing when the cranks, to which the opposite ends of the connecting rods are connected, are on their vertical centers;

Figure 4, a part elevational view and a part sectional view particularly showing the position of the cross-head when the cranks to which the connecting rods are connected, are on horizontal centers; and Figure 5, a part elevational and a part vertical sectional view, showing the cross-head at right angles to the view of Figure 4, the section being taken on line 5—5 of Figure 4.

As illustrated, I have shown my power transmission mechanism applied to a boat or water craft of the stern wheel propeller type and as shown, 1 designates the boat having a stern wheel propeller 2 of the usual and well known construction.

In the drawings I have shown two similar power transmitting units; one disposed on the starboard and one on the port side. Each unit comprises an electric motor 3 designed to be connected up with a crank shaft 4 of the propeller wheel 2 by means of the transmission mechanism.

As illustrated and as preferred, the drive shaft of the motor 3 is provided with a pinion 6, said pinion being adapted to mesh with a reduction gear-wheel 7, the ratio of the gears may be such as to give the desired speed of rotation to the propeller wheel without the necessity of other reduction gearing being employed, but of course, other gearing than that shown may be used if desired.

The cross-head of my power transmission mechanism is connected with the gear-wheel 7 through a wrist pin 8 mounted thereon and a connecting rod 9, and is mounted on horizontally extending slides or guides 11, in such a manner as to provide a compound rectilinear and oscillating movement thereon. The cross-head is in turn connected with the crank shaft 4 of the propeller wheel by a second connecting rod 12, the latter being journalled to the lower portion of the cross-head and its opposite end connected with a wrist pin 13 of a crank 14 carried on shaft 4.

The cross-head as preferred, comprises a divided body portion 15, said body portion being formed with trunnions 16 projecting from opposite faces thereof. The divided body is further provided with journals 17 and 18, journal 17 being adapted to form the engaging member for the connecting rod 9 and the journal 18 being designed to connect the connecting rod 12 with the cross-head structure. Located on each of the opposite sides of the cross-head body and constituting bearings for the trunnions 16 is a non-rotatable slide or gib member 19. Each of the slide members 19 is formed with a central bore adapted to receive the respective trunnions 16; each member 19 is further provided with slots 20 to receive lugs or stop members 21 formed on the respective journals 16. Each slide member is formed with an outwardly projecting part 22 having a slotted portion 23, the latter being adapted to engage the slides 11.

From the foregoing it will be noted that the cross-head structure 10 comprises the oscillatory divided body 15 pivotally mounted on the reciprocating slide members, the latter having the rectilinear motion above described. The divided body 15 of the cross-head being pivotally mounted at its center and having the respective connecting rods secured on journals disposed near its top and bottom portions has the effect of a double crank device. In practice and as shown the angular disposition of the stop members 21 and the slots 20 is such as to limit the oscillatory movement of the body 15 when the cranks on the said driving and driven members have reached either the horizontal or the vertical position; these positions and the position of the stop members relatively to the walls of the slots are shown by Figures 3 and 4, of the drawings.

It will be understood that by the construction of and the arrangement of the parts as described and shown, I provide a construction in which the difference in travel of the reciprocating slide members, on which the cross-head bodies are mounted, in their forward and after movement after the cranks pass the vertical and horizontal centers, is compensated for by the rotary or oscillating movement of the body 15.

It will be further understood that in place of employing the specified form of cross-head structure described and shown and the manner of mounting it to produce the desired operative connections between the crank of the driving element and the crank of driven element and the results desired to be accomplished, other means may be employed so long as the said means will function to automatically compensate for the variation of the throw of the cranks during their forward and after center movement.

What I claim is:—

1. The combination with a rotary driving element and a rotary driven element, of power transmission mechanism interposed between said elements including a cross-head slide, a cross-head structure comprising a slide member mounted on the slide, a cross-head body pivotally mounted on the slide member, a connecting rod connecting the cross-head body and the driving element, and a connecting rod connecting the driven element and said cross-head body.

2. The combination with a rotary driving element having a crank, a rotary driven element having a crank, of power transmission mechanism including a cross-head slide, a cross-head structure comprising slide members mounted on the slide, a cross-head body disposed between and pivotally carried by the slide members, connecting rod journals on the cross-head body, a connecting rod between the driving element crank and one of the journals, and a connecting rod between the other body journal and the crank of the driven element.

3. The combination with a driving element, a driven element and connecting rods for said elements movable substantially simultaneously and in the same general direction; of a body, said connecting rods being pivotally secured to said body, a slide, and said body being pivoted on said slide on an axis passing intermediate the adjacent axes of the connecting rods.

In testimony whereof I affix my signature.

THOMAS DUNBAR.